United States Patent Office 3,741,976
Patented June 26, 1973

3,741,976
PROCESS FOR THE PRODUCTION OF PYRIDINE CARBOXYLIC ACIDS FROM LOWER ALYKYL PYRIDINES
August Stocker, Othmar Marti, Theodul Pfammatter, and Gerhart Schreiner, Visp, Switzerland, assignors to Lonza Ltd., Basel, Switzerland
No Drawing. Continuation-in-part of application Ser. No. 871,951, Oct. 28, 1969. This application Dec. 21, 1971, Ser. No. 210,557
The portion of the term of the patent subsequent to Mar. 28, 1989, has been disclaimed
Int. Cl. C07d 31/38
U.S. Cl. 260—295.5 R                    14 Claims

ABSTRACT OF THE DISCLOSURE

Nicotinic acid and other carboxylic acids having a pyridine nucleus may be prepared by the oxidation of lower alkyl pyridine compounds in the presence of 25 to 600 percent excess nitric acid at temperatures of 180° to 370° C. and at pressures of 20 to 500 atm. The nitric acid concentration of the reaction mixture is adjusted to 10 to 28 percent to precipitate the oxidation product as a crystalline hydronitrate, which is separated from the mixture. The pH of an aqueous solution of the pyridine carboxylic acid hydronitrate is adjusted with the basic starting material to the isoelectric point of the specific pyridine carboxylic acid to precipitate the same. The crystalline precipitation is separated and the mother liquors are combined and recycled as the starting material after adjustment of the concentrations therein.

CROSS-REFERENCE TO RELATED APPLICATION

This application is a continuation-in-part application of co-pending U.S. application Ser. No. 871,951, filed on Oct. 28, 1969, now U.S. Patent No. 3,657,259, issued Apr. 18, 1972.

BACKGROUND OF THE INVENTION (1) Field of this invention

This invention relates to a process for the production of carboxylic acids containing a pyridine nucleus through oxidation of pyridine compounds with nitric acid at elevated temperatures and at elevated pressures.

(2) Prior art

Pyridine carboxylic acids have been produced by the oxidation of alkyl pyridines with nitric acid. In practicing this process, one generally proceeds in such a manner that the solution, containing the pyridine carboxylic acid, emerges from the reactor with a pH value which corresponds precisely to the isoelectric point of the pyridine carboxylic acid. Then the pyridine carboxylic acid is crystallized out and separated. However, the disadvantage of this method of operation lies in the fact, that the pyridine carboxylic acid product is impure and the mother liquor still contains large quantities of pyridine bases and pyridine carboxylic acids. Working up of this mother liquor is very expensive and has been found commercially unsatisfactory. For example, nicotinic acid is produced by this prior art process through oxidation of 2-methyl-5-ethyl pyridine. The starting mixture usually contains 5 to 6 moles of the pyridine compound that is converted at 190° to 200° C. and 35 atmospheres to isocinchomeronic acid which is decarboxylized to nicotinic acid at 220° C. These reactions require about 40 to 45 minutes. The solution leaving the reactor has a pH value of 3.4 and nicotinic acid is crystallized from this solution as a bright yellow product. The starting material reacted is approximately 80 percent and the yield is about 70 percent of the reacted starting material. The resulting mother liquor must be concentrated in order to further recover nicotinic acid therefrom and the unreacted starting material is isolated from the remaining filtrate.

DESCRIPTION ON THIS INVENTION

This invention eliminates the disadvantages of the prior art processes.

According to this invention, about 25 to about 600 percent of excess nitric acid is used above the quantity required in theory for oxidation of the pyridines. Also, the mixture is oxidized at temperatures of 180° to 370° C., preferably 230° to 350° C., and at pressures of 20 to 500 atm., preferably 50 to 300 atm., for a reaction time from 2 seconds to 30 minutes. The resulting reaction mixture is adjusted to have a nitric acid concentration of 10 to 28 percent, and the pyridine carboxylic acid is crystallized out at a temperature of 0° to 20° C., as a hydronitrate, which is separated from the acid mother liquor. The crystallized pyridine carboxylic acid hydronitrate is then dissolved in water, the pH of the solution is adjusted with the basic starting material to the isoelectric point of the pyridine carboxylic acid product, and the pyridine carboxylic acid is separated by crystallization. The base containing mother liquor and the acid containing mother liquor are combined, fortified to adjust concentrations and recycled as the starting mixture.

The use of an excess of HNO$_3$, which is preferably 30 to 400 percent above the quantity theoretically required for the oxidation, promotes the formation of the hydronitrate of the pyridine carboxylic acid.

While the reaction time varies within the boundaries, 8 to 14 minutes generally provides a favorable balance of a high conversion percentage against decomposition of the pyridine carboxylic acid product within the preferred ranges. One skilled in the art can determine the optimum reaction time without difficulty because the time will be in the range of about 2 seconds to 30 minutes.

The nitric acid concentration of the reaction mixture containing the hydronitrate is adjusted to the point of minimum solubility to obtain a maximum separation of the hydronitrate. It is particularly advantageous to precipitate the hydronitrate at 4° to 12° C. from a reaction mixture having a nitric acid concentration of 12 to 25 percent by weight based on the total weight of the reaction solution.

The precipitate of hydronitrate is dissolved in a small amount of water and the pyridine carboxylic acid is formed by the addition of supplemental pyridine compound. During this addition, pyridine carboxylic acid is precipitated. The quantity of pyridine compound which is added varies with the isoelectric point of the particular pyridine carboxylic acid to be preciptiated. To improve the product purity, it is advantageous to briefly heat the precipitated pyridine carboxylic acid to redissolve the acid and then to cool the solution to obtain a second precipitation. The pyridine carboxylic acid thus obtained from the base containing mother liquor is a substantially pure product.

Since the pyridine carboxylic acid was formed by the pyridine compound, the mother liquor obtained after separation of the acid product will contain large quantities of this starting material. This mother liquor is combined with the mother liquor resulting from the separation of the hydronitrate, the concentrations are adjusted by the addition of starting material and nitric acid, and this solution is then recycled.

One advantage of the process of this invention is that many diverse carboxylic acids having a pyridine nucleus can be produced. For example, nicotinic acid, isonicotinic acid, picolinic acid, isocinchomeronic acid, cinchomeronic acid can be prepared from lower alkyl pyridines, such as methyl-ethyl pyridines, picolines, lutidines, dimethyl pyridines, collidines and ethyl pyridines. Specific examples of useful lower alkyl pyridines include 4-isopropyl pyridine, 4-propyl pyridine, 4-ethyl pyridine, 3-ethyl pyridine, 2-ethyl pyridine, 2,4,6-trimethyl pyridine, β-parvoline, 2-ethyl-3,5-dimethyl pyridine, 2-ethyl pyridine, 3-ethyl-4-methyl pyridine, 5-ethyl-2-methyl pyridine, 4-ethyl-2-methyl pyridine, 2-isopropyl pyridine, 2,5-dimethyl pyridine, 2,3,4-trimethyl pyridine, 2,4-dimethyl pyridine, 2,3,6-trimethyl pyridine, 2,3-dimethyl pyridine, 2,3,5-trimethyl pyridine, 3,5-dimethyl pyridine, 2,4,5-trimethyl pyridine, 3,4-dimethyl pyridine, 3,4,5-trimethyl pyridine, 2,6-dimethyl pyridine, 2-ethyl-4-methyl pyridine, and 2-ethyl-6-methyl pyridine. In addition, nicotinic acid, dinicotinic acid, carbisocinchomeronic acid, carbodinicotinic acid and 2,3,5,6-pyridinetetracarboxylic acid may be prepared from fused ring compounds having a pyridine core, such as quinoline, derivatives of quinoline such as, quinaldine, lepidine, hydroxyquinoline, and aminoquinoline, isoquinoline, similar derivatives of isoquinoline, acridine and similar derivatives of acridine. The alkyl substituents may contain 1 to 20 carbon atoms, and alkyl groups of 1 to 4 carbon atoms are preferred.

The use of 30 to 400 percent of excess nitric acid over the theoretical quantity is preferred.

The oxidation by this process results in conversions of 95 to 99 percent with a substantially pure product yield of up to 94 percent. Because of the product purity, further purification is unnecessary.

Reaciton vessels made of titanium are preferred and, if the higher pressures of the disclosed range are used, titanium lined steel pipe is satisfactory.

The temperature at which the oxidation is conducted may be selected to decarboxylate the acid formed. If the oxidation is conducted at temperatures above about 250 C., the corresponding acid is decarboxylated and is not isolated. The following reactions demonstrate several examples of acids which may be prepared directly by oxidation, as well as by oxidation-decarboxylation.

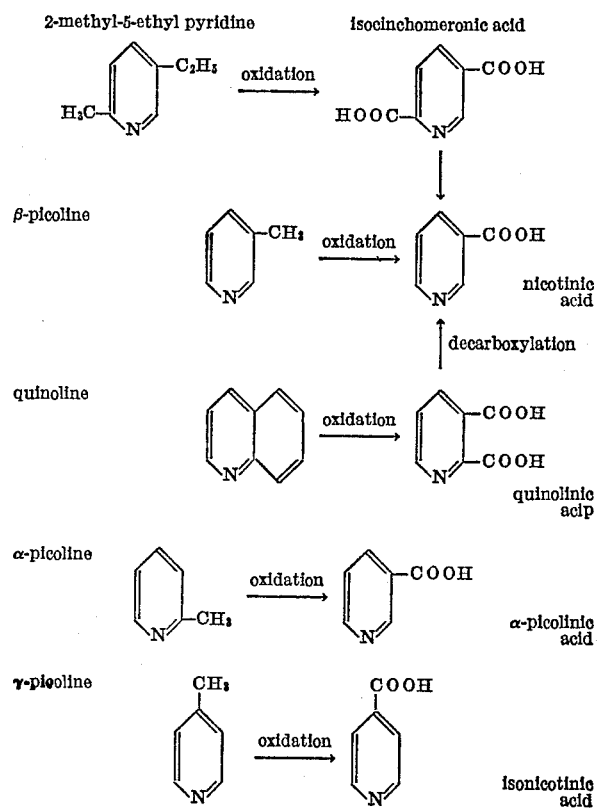

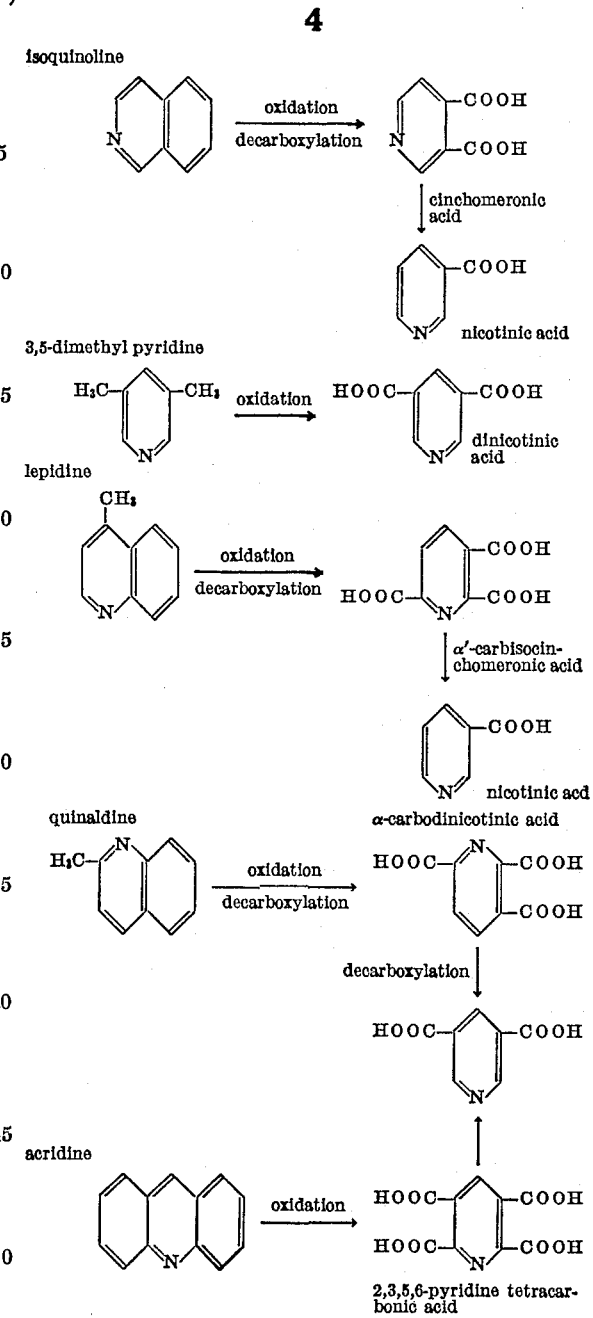

The following examples are presented:

EXAMPLE I 4632 gm. of a mixture of 6.3 percent 2-methyl-5-ethyl pyridine and 28.1 percent $HNO_3$ (corresponding to a surplus of about 42 percent over theoretical) were passed through a 1.48 liter reactor tube made of V2A steel at a temperature of 239° C. and at 55 atm. of pressure. The retention times was 12.72 minutes and the conversion took 35 minutes. The liquid reaction product weighed 3966 gm. The remainder, 66 gm. (14.35 percent), was passed off as a gas. The liquid reaction product was concentrated by boiling until the nitric acid concentration was 15 percent and then it was cooled to 5° C. 354.2 gm. of nicotinic acid hydronitrate with a nicotinic acid content of 66.1 percent were crystallized out. This product was separated from the acid mother liquor (833 gm.) by centrifuging. An additional 30.8 gm. of nicotinic acid were contained in the mother liquor with the content of isocinchomeronic acid being below 0.1 percent.

The nicotinic acid hydronitrate (354.2 gm.) was dissolved in 1100 gm. water, heated to 60° C., adjusted to a pH value of 3.3 by addition of 2-methyl-5-ethyl pyridine (230 gm.) and was heated to 90° C. After cooling, the precipitated nicotinic acid was centrifuged off and dried. The yiled was 188 gm. of nicotinic acid with a conversion of 95 percent based on the 2-methyl-5-ethyl pyridine corresponding to an isolated yield of 66.9 percent. The total yield (isolated nicotinic acid and nicotinic acid in the mother liquor) amounted to 94.5 percent. The two mother liquors were combined and still contained 77.8 gm. of nicotinic acid and 244.81 gm. of 2-methyl-5-ethyl pyridine. These mother liquors were adjusted to the starting concentration by additions of 2-methyl-5-ethyl pyridine and nitric acid.

The solution at the starting concentration, was converted and worked up as described previously. This process produced 250 gm. of nicotinic acid, corresponding to an isolated yield of 88.9 percent at a conversion of 95 percent. The nicotinic acid obtained was pure white and the purity was 99.6 percent.

EXAMPLE II

The mother liquor of a previous deposit, containing 77.0 gm. of nicotinic acid, 236.7 gm. of 2-methyl-5-ethyl pyridine and 120 gm. of $HNO_3$ (100 percent), was adjusted to a weight of 4432 gm. and a concentration of 4.68 percent of 2-methyl-5-ethyl pyridine and 19.5 percent of $HNO_3$ (corresponding to a surplus of 32 percent) by the addition of 2-methyl-5-ethyl pyridine and nitric acid. This solution was used as the starting mixture and was conducted through a 1.6 liter titanium reactor tube (length being about 16 m.) at 234° C. and a 52 atm. with a retention time of 8.7 minutes. The reacted mixture was treated according to the procedure of Example 1. The conversion was 97.3 percent and 166 gm. of nicotinic acid resulted, which corresponded to an isolated yield of 82.0 percent. The mother liquors were again combined and returned to the process.

EXAMPLE III 4500 gm. of a mixture of 5.18 percent β-picoline, 35 percent nitric acid (corresponding to a surplus of 400 percent beyond the theoretical quantity) were raised through a 1.6 liter titanium reactor tube at a temperature of 260° C. and at 50 atm., with a retention time of 3.75 minutes.

4115 gm. of a liquid reactor product resulted. The remainder, 385 gm. (8.6 percent) was conducted off in the form of a gas. The liquid reaction product was adjusted to a nitric acid concentration of 25 percent and was cooled to 5° C. This precipitated 213.4 gm. of nicotinic acid hydronitrate with a nicotinic acid content of 66.3 percent and was separated from the acid mother liquor (950 gm.) by centrifuging. There was an additional 47.5 gm. of nicotinic acid contained in the mother liquor.

The nicotinic acid hydronitrate (213.4 gm,) was dissolved in 710 gm. of water, heated to 60° C., adjusted to a pH value of 3.4 with β-picoline (107 gm.) and heated to 95° C.

After cooling, the nicotinic acid was centrifuged off and dried. 113.0 gm. of nicotinic acid was obtained at a conversion of 68.6 percent based on the β-picoline used. This corresponds to an isolated yield of 60.4 percent and a total yield (isolated nicotinic acid and nicotinic acid in the mother liquor) of 89.0 percent.

The acid and the base containing mother liquors were combined and contained 47.5 gm. of nicotinic acid and 180 gm. of β-picoline. These combined mother liquors were adjusted to the starting concentration and volume with β-picoline and $HNO_3$. This solution was recycled through the reactor tube to produce 151.8 gm. of nicotinic acid, corresponding to an isolated yield of 80.5 percent, based on a conversion of 68.6 percent. The nicotinic acid obtained was pure white having a purity of 99.7 percent.

EXAMPLE IV 4500 gm. of a mixture of 8.0 percent quinoline with 32 percent nitric acid (corresponding to 50 percent excess of the theoretical quantity) with a residence time of 2.0 minutes were passed through a 1.6 liter titanium reactor pipe (length 16 m.) at a temperature of 260° C. and at 55 atm. 4010 gm. of a liquid raw product resulted. The remainder of 4090 gm. was released in the form of a gas. The liquid reaction product was adjusted to a nitric acid concentration of 25 percent and cooled to 0° C. to precipitate 380.0 gm. of nicotinic acid hydronitrate with a nicotinic acid content of 66.3 percent. This raw product was separated from the acid mother liquor (1020 gm.) by centrifuging and 46.0 gm. of nicotinic acid remained in the mother liquor.

The nicotinic acid hydronitrate (380 gm.) was dissolved in 1350 gm. of water and adjusted to a pH of 3.4 by quinoline at 95° C. After cooling to 7° C., the nicotinic acid precipitated and was centrifugally separated and dried. 210 gm. of nicotinic acid resulted with a conversion of 96 percent based on the quinoline corresponding an isolated yield of 63.9 percent.

The total yield, isolated nicotinic acid in the mother liquor, was 92.0 percent.

The acid and the mother liquors were combined and adjusted by quinoline and nitric acid to the starting concentration and quantity. This solution was recycled and processed under the conditions described above to produce 283.0 gm. of nicotinic acid, corresponding to an isolated yield of 86 percent with quinoline conversion of 96 percent. The nicotinic acid was pure white and had a purity of 99.8 percent.

EXAMPLE V 4720 gm. (4000 ml.) of a mixture of 6.4 percent of 2-methyl-5-ethyl pyridine and 33 percent of $HNO_3$ were passed through a 30.5 ml. titanium reaction tube during a period of 12 minutes at 330° C., and at 280 atm. The liquid reaction product weighed 4090 gm. The remainder, 630 gm. (13.3 percent) was removed as gas.

The reaction product was reduced by evaporation to a nitric acid concentration of 25 percent and cooled to 0° C. This precipitated as crystals; 394.7 gm. of nicotinic acid hydronitrate with a nicotinic acid content of 66.3 percent. This product was separated by centrifuging from the acid mother liquor (870 gm.). The mother liquor contained an additional 30 gm. of nicotinic acid. The content of isocinchomeronic acid in the mother liquor was 0.25 percent.

The nicotinic acid hydronitrate (394.7 gm.) was dissolved in 1200 gm. of water, heated to 95° C. and adjusted to a pH of 3.3 with 287.0 gm. of 2-methyl-5-ethyl pyridine. After cooling, the liberated crystallized nicotinic acid was centrifuged off and dried. 204 gm. of nicotinic acid was obtained at a conversion of 95 percent based on the 2-methyl-5-ethyl pyridine. This corresponds to an isolated yield of 70.0 percent with a total yield (isolated nicotinic acid and nicotinic acid in the mother liquor) of 95.0 percent. The two combined mother liquors still contained 73 gm. of nicotinic acid and 302.0 gm. of 2-methyl-5-ethyl pyridine.

These combined mother liquors were again adjusted to the starting concentrations and quantity by nitric acid and recycled through the process. There resulted 248.0 gm. of nicotinic acid, corresponding to an isolated yield of 84.0 percent, at a conversion of 95.0 percent. The nicotinic acid obtained was pure white and had a purity of 99.6 percent.

EXAMPLE VI 4500 gm. of an aqueous solution containing 233 gm. of β-picoline and 883 gm. of $HNO_3$ (corresponding to an excess of 600 percent beyond the theoretically necessary quantity) were passed through a reaction tube made of titanium having a volume of 1.6 liters (length approximately 16 m.), at a temperature 260° C. and at 50 atm.

pressure with a retention time of 3.2 minutes. 4095 gm. of a liquid reaction product resulted. The remaining 405 gm. (9.0 percent) was passed off in the form of a gas. The reaction product was brought to a $HNO_3$ concentration of 28 percent and was cooled to 5° C. In this case, 226.3 gm. of nicotinic acid hydronitrate with a nicotinic acid content of 66.2 percent was crystallized out. This product was separated by centrifuging from the acid mother liquor (1010 gm.). An additional 72.0 gm. of nicotinic acid remained in the mother liquor.

The nicotinic acid hydronitrate (226.3 gm.) was dissolved in 780 gm. of water, was heated to 95° C. and was brought to a pH of 3.3 by adding 112.5 gm. β-picoline. After cooling, the liberated nicotinic acid was centrifuged off and dried. 139.0 gm. of nicotinic acid resulted; at a conversion of 72 percent, related to the β-picoline used, this corresponds to an isolated yield of 63 percent. The total yield (isolated nicotinic acid plus nicotinic acid in the mother liquor) amounted to 91.0 percent. The mother liquor containing the acid and the mother liquor containing the base were combined and contained an addditional 82.5 gm. of nicotinic acid, as well as 177.5 gm. of β-picoline. These combined mother liquors were brought up to a starting concentration and quantity by the addition of β-picoline and $HNO_3$. The solution brought up in this manner to the starting quantity and concentration was converted and processed under the conditions described above. In this case there was obtained 166 gm. of nicotinic acid, which corresponded to an isolated yield of 82 percent, as related to a conversion of 72.0 percent. The resultant nicotinic acid was pure white and had a purity of 99.7 percent.

EXAMPLES VII TO IX

Example VI was repeated thrice except that 2-hexyl pyridine, 2-methyl-5-hexyl pyridine and 2-nonyl pyridine, respectively, were used in place of β-picoline.

What is claimed is:

1. A process for the production of a pyridine carboxylic acid from a lower alkyl pyridine which consists of: oxidizing a lower alkyl pyridine with nitric acid, said nitric acid being present in an amount from about 400 to about 600 percent in excess of the theoretical quantity, at about 180° to about 370° C. under about 20 to 500 atm. of pressure for at least 2 seconds; precipitating the oxidation product as a hydronitrate; forming an aqueous solution by dissolving the hydronitrate in water; and recovering the carboxylic acid derivative of pyridine from the aqueous solution.

2. A process according to claim 1 wherein said lower alkyl pyridine has more than one alkyl group.

3. A process according to claim 2 wherein said alkyl groups have 1 to 4 carbons.

4. A process according to claim 1 wherein said lower alkyl pyridine is selected from the class consisting of methyl-ethyl pyridines, picolines, collidines, lutidines, and ethyl pyridines, and dimethyl pyridines.

5. A process according to claim 1 wherein the temperature of oxidation is from 230° to 350° C., and the pressure is from 50 to 300 atm.

6. A process according to claim 1 wherein the hydronitrate is precipitated at about 0° to 20° C. by adjusting the nitric acid concentration of the reacted mixture to about 10 to 28 percent.

7. A process according to claim 2 wherein the temperature of oxidation is from 230° to 350° C., and the pressure is from 50 to 300 atm.

8. A process according to claim 1 wherein said pyridine carboxylic acid is separated by adjusting the pH of the aqueous solution to the isolectric point of said pyridine carboxylic acid with said lower alkyl pyridine to effect precipitation.

9. A process according to claim 1 wherein the hydronitrate is precipitated at about 0° to 20° C. by adjusting the nitric acid concentration of the reacted mixture substantially to the point of minimum solubility for the specific hydronitrate.

10. A process according to claim 9 wherein the temperature during precipitation is 4° to 12° C. and the nitric acid concentration of the reacted mixture is adjusted to about 12 to about 25 percent.

11. A process according to claim 10 wherein said pyridine carboxylic acid is separated by adjusting the pH of the aqueous solution to the isoelectric point of said pyridine carboxylic acid with said lower alkyl pyridine to effect precipitation.

12. A process according to claim 11 wherein the aqueous solution is heated prior to the separation step.

13. A process for the production of a pyridine carboxylic acid from a lower alkyl pyridine which consists of: oxidizing a lower alkyl pyridine with nitric acid, said nitric acid being present in an amount from about 400 to about 600 percent in excess of the theoretical quantity, at about 180° to about 370° C. under about 20 to 500 atmospheres of pressure for at least 2 seconds; precipitating the oxidation product as a hydronitrate; forming an aqueous solution by dissolving the hydronitrate in water; recovering the carboxylic acid derivative of pyridine from the aqueous solution; combining the mother liquors resulting from the precipitation step and the recovery step; adjusting the combined mother liquors to substantially the same concentrations as the oxidation mixture; and recycling the adjusted combined mother liquors through the process as starting material.

14. A process according to claim 13 wherein said pyridine carboxylic acid is separated by adjusting the pH of the aqueous solution to the isoelectric point of said pyridine carboxylic acid with said lower alkyl pyridine to effect precipitation.

References Cited

UNITED STATES PATENTS

| | | | |
|---|---|---|---|
| 2,723,271 | 11/1955 | Martin | 260—295 R |
| 3,165,548 | 1/1965 | Bartholome et al. | 260—295 R |
| 3,657,259 | 4/1972 | Stocker et al. | 260—295 R |

ALAN L. ROTMAN, Primary Examiner

U.S. Cl. X.R.

260—295 R